United States Patent [19]

Katsura et al.

[11] 4,446,517

[45] May 1, 1984

[54] MICROPROGRAM MEMORY WITH PAGE ADDRESSING AND ADDRESS DECODE IN MEMORY

[75] Inventors: Koyo Katsura; Hideo Maejima, both of Hitachi, Japan

[73] Assignee: Hitachi, Ltd., Tokyo, Japan

[21] Appl. No.: 269,608

[22] Filed: Jun. 2, 1981

[30] Foreign Application Priority Data

| Jun. 2, 1980 | [JP] | Japan | 55-72715 |
| Dec. 5, 1980 | [JP] | Japan | 55-170942 |
| Mar. 20, 1981 | [JP] | Japan | 56-39593 |

[51] Int. Cl.³ .............................................. G06F 9/22
[52] U.S. Cl. .............................................. 364/200
[58] Field of Search ... 364/200 MS File, 900 MS File, 364/200

[56] References Cited

U.S. PATENT DOCUMENTS

| 3,949,370 | 4/1976 | Reyling, Jr. | 364/200 |
| 3,980,992 | 9/1976 | Levy | 364/200 |
| 4,008,462 | 2/1977 | Kanda | 364/200 |
| 4,021,781 | 5/1977 | Candel | 364/900 |
| 4,091,446 | 5/1978 | Demonte | 364/200 |
| 4,099,230 | 7/1978 | Mead | 364/200 |
| 4,224,668 | 9/1980 | Peters | 364/200 |
| 4,323,964 | 4/1982 | Gruner | 364/200 |

*Primary Examiner*—Raulfe B. Zache
*Attorney, Agent, or Firm*—Antonelli, Terry & Wands

[57] ABSTRACT

A microprogram control system in which the processing speed of a microprogram is increased and the capacity of the microprogram memory is reduced. The decoder previously provided in microprogram control systems to decode the contents of the instruction register are omitted to attain an increased processing speed and the instruction decoding function is integrated into the microprogram memory to attain a general purpose control system. The microprogram memory is divided into pages each consisting of a plurality of words, so that an arbitrary page can be designated as an instruction decode area under the control of the microprogram. Error checking in the system is facilitated by providing a check function for readout error, and a short word memory device is used to reduce the memory capacity of the microprogram memory.

14 Claims, 26 Drawing Figures

(A) 6b IN FIG. 6 WHEN READ OUT OF MAIN MEMORY (B) 6b IN FIG. 6 IN BRANCH OPERATION (ADDRESS DESIGNATED BY PREVIOUS MICROINSTRUCTION)

MICROPROGRAM MEMORY WITH PAGE ADDRESSING AND ADDRESS DECODE IN MEMORY

BACKGROUND OF THE INVENTION

The present invention relates to a microprogram control method and an apparatus therefor having a microprogram memory with an instruction decoding function, in which, more particularly, the microprogram memory is arranged to store short word length microinstructions and to detect an abnormal microprogram sequence.

In the microprogram control system, all of the control items are stored in the microprogram memory. Accordingly, the contents of the memory may be updated to allow a different execution than the old one previously stored.

On the other hand, in order to execute a different instruction set, the contents of an instruction decoder must also be modified. However, since the instruction decoder is usually constructed to comply with a particular instruction set, a sufficiently large scale decoder circuit must be provided or troublesome modification of the circuit configuration is required in order to execute a completely different instruction set.

The present invention permits the flexibility to operate with a different instruction set without losing generality so that the microprogram control system can be used for general purpose while a memory capacity for storing the microprograms can be reduced and also it has a function to detect an abnormal microprogram sequence.

In an instruction fetch microroutine, an instruction word is read out of a main memory and an instruction decoder decodes it to generate an initial address of a microroutine corresponding to that instruction. The generated initial address is stored in a microprogram address register through address selection means, and a microinstruction word specified by the register is read out of a microprogram memory. An operation field (code) of the read-out microinstruction is stored in a microinstruction register and an address field (code) of the microinstruction is returned to the address selection means. The operation field (code) of the microinstruction is decoded by a microinstruction decoder, which generates various control signals. On the other hand, the content of the address field of the microinstruction returned to the address selection means is transferred to a microprogram address register to sequentially read out and execute the microinstructions. The above is an example of a prior art system.

In the system, a time period from the decode of the instruction to the generation of the initial address is mainly determined by the access time of the memory, although it may vary depending on the configuration and the scale of the instruction decoder. In this system, therefore, the configuration of the instruction decoder governs the operation speed of the processor.

Another known system is a mapping system. Such a system is in many cases used in a computer having a simple instruction set. In this system, a fixed bit pattern generating means is provided and an output signal from the bit pattern generating means and the contents of an instruction register which stores the word read out of the main memory are combined to generate an initial address of a microroutine. This system may be called a simplified system in that it does not use an instruction decoder. While this system needs shorter time than the previously mentioned system to establish the output of the microprogram address register, it is not a general purpose system because it cannot be used for a system with a complex instruction set having two or more instruction codes because a branch-to address to the instruction code is fixed in this system.

Furthermore, where a plurality of instruction codes have a common operation, the capacity of the microprogram memory increases because the branch-to addresses are different. In this sense, this system is not a practical one. The above two prior art systems will be further discussed later.

A method for reading a microprogram is disclosed in U.S. Pat. No. 4,008,462 entitled "Plural Control Memory System with Multiple Microinstruction Readout". It discloses a control system which permits the readout of the microinstructions at the same speed as that of the microinstruction readout in a prior art system, even with a low performance control memory. However, this method is applicable only to a system having a control memory bank which reads out a plurality of microinstructions by a single address designation.

SUMMARY OF THE INVENTION

It is a principal object of the present invention to provide a microprogram control system in which an instruction decoder which otherwise would be required to be disposed immediately downstream from an instruction register may be omitted so that a processing speed is increased and the instruction decoding function is integrated in a microprogram memory thereby to increase its flexible generality.

It is another object of the present invention to provide a microprogram control system having an improved microprogram memory efficiency in which microprograms having high frequency of use are described in short length words.

It is a further object of the present invention to provide a microprogram control system including means for rapidly detecting an abnormal microprogram control sequence which is caused by an error in decoding an address in a microprogram memory.

In order to attain the above objects, it is a main feature of the present invention to divide the microprogram memory into plural-word pages and provide a page allocation register controlled by the microprogram and an address-in-page allocation register which can directly read in the content of the instruction register so that any desired page can be used as an instruction decode area.

It is another feature of the present invention to construct the microprogram memory by a first microprogram memory for storing long word microinstructions capable of general representation and a second microprogram memory for storing short word microinstructions which have high frequency of use and represent limited processes. When a short word microinstruction is read out, it is restored to an original long word microinstruction by a bit pattern generating circuit.

It is a further feature of the present invention to provide in each microinstruction phase information on a reference clock having a period which is a multiple of the microinstruction execution clock period and, when a microinstruction is read out, to detect any abnormal microinstruction control sequence by checking if the phase information has a predetermined relationship with the phase of the reference clock.

The objects, features and advantages of the present invention will be understood from the following description of various embodiments of the present invention in conjunction with the accompanying drawings in which,

DETAILED DESCRIPTION OF THE PREFERRED EMBODIMENTS

In order to facilitate the understanding of the present invention, the technical background thereof will be first explained.

Figure 1A:
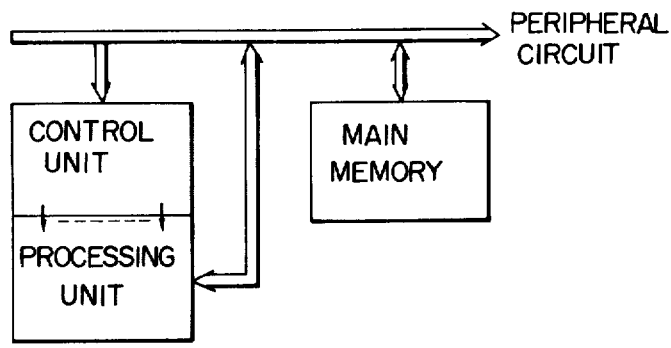
FIG. 1A shows a general arrangement of a system using a microprogram control unit of the present invention.
Figure 1B:
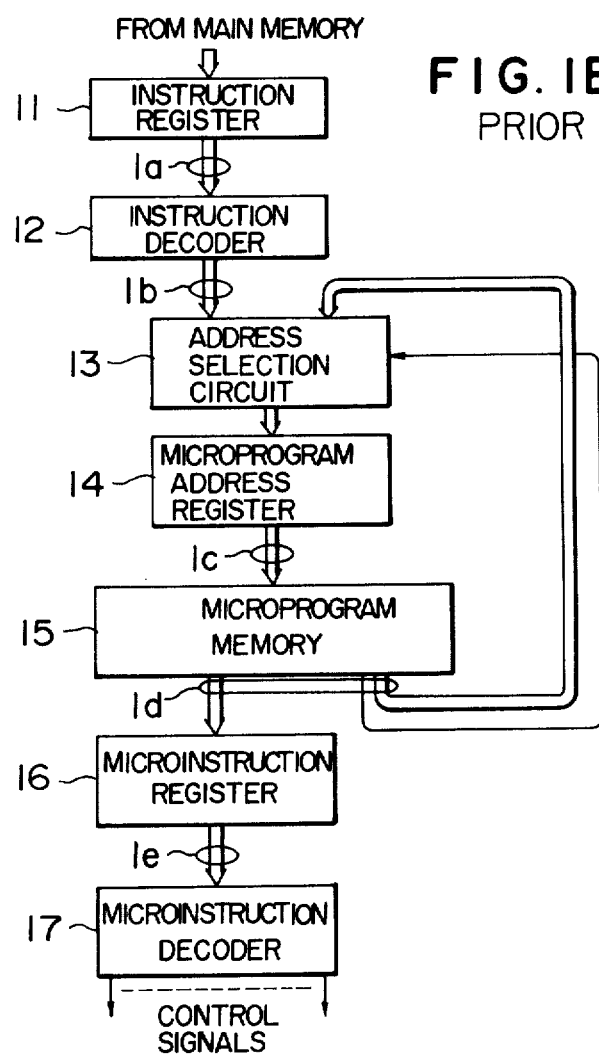
FIG. 1B shows a block diagram of a prior art microprogram control unit.

FIG. 1A shows a schematic block diagram of a system including a main memory and a processor or a peripheral circuit connected to a bus line, and FIG. 1B shows a prior art microprogram control unit which corresponds to the control unit of the processor shown in FIG. 1A. An output of a microinstruction decoder or a control signal controls the processing unit (FIG. 1A).

Figure 2:
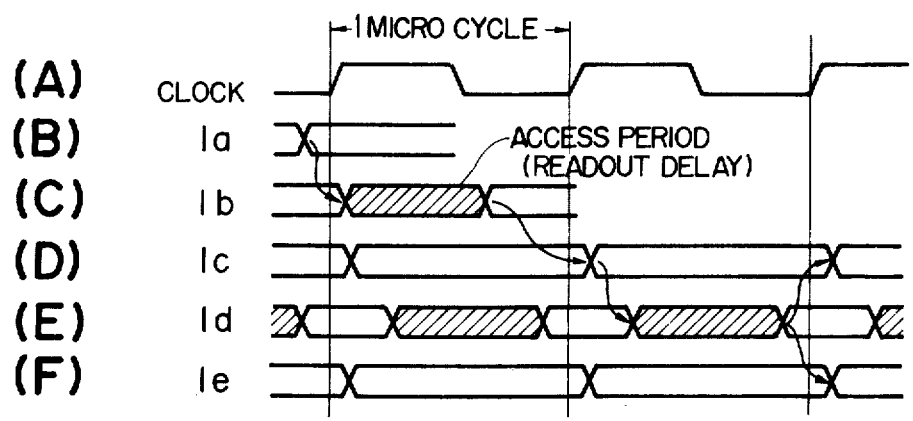
FIG. 2 shows a timing chart therefor.

The microprogram control system shown in FIG. 1B comprises an instruction register 11, an instruction decoder 12, an address selection circuit 13, a microprogram address register 14, a microprogram memory 15, a microinstruction register 16 and a microinstruction decoder 17. In an instruction fetch microroutine, an instruction word is read out of the main memory and stored into the instruction register 11. The instruction decoder 12 decodes the content of the instruction register 11 to generate an initial address of a microroutine corresponding to the instruction code. The initial address generated by the instruction decoder 12 is loaded into the microprogram address register 14 through the address selection circuit 13 and a microinstruction word corresponding to the address is read out of the microprogram memory 15. An operation field (code) of the read-out microinstruction is loaded into the microinstruction register 16 while an address field (code) of the microinstruction is returned to the address selection circuit 13. The content of the microinstruction decoder 16 is decoded by the microinstruction decoder 17, which generates various control signals. On the other hand, the content of the address field returned to the address selection circuit 13 is transferred to the microprogram address register 14 so that the microinstructions are sequentially read out and executed. FIG. 2 shows a timing chart thereof, in which an output 1a of the instruction register 11, an output 1b of the instruction decoder 12, an output 1c of the microprogram address register 14, an output 1d of the microprogram memory 15 and an output 1e of the microinstruction register 16 are shown together with a basic clock. Hatched areas in FIG. 2 show periods in which signals are not established due to delay times in the circuit representing a time period from the establishment of the output 1a of the instruction register 11 to the establishment of the output 1b of the instruction decoder 12, or in other words a time period from the decoding of the instruction to the generation of the initial address is essentially comparable to an access time of the memory although it may vary depending on the configuration and the scale of the instruction decoder. FIG. 2 shows that one microinstruction cycle, called a "microcycle", is necessary as the waiting time before starting the read-out of the microprogram memory. As discussed hereinabove in connection with the prior art, this system has problems in the processing speed and the general application of the system.

Figure 3:
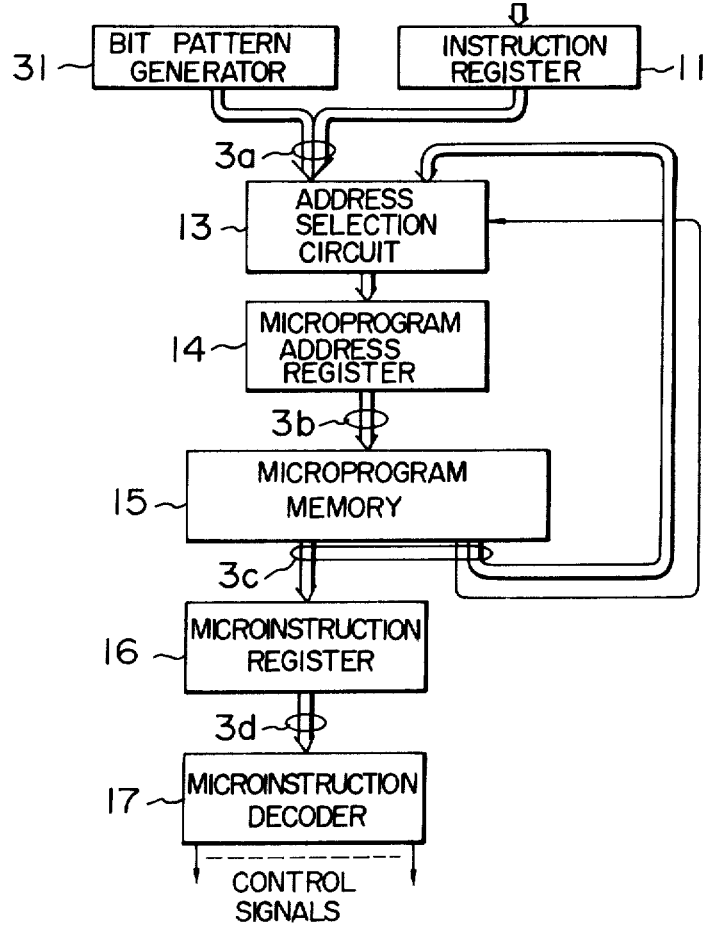
FIGS. 3 and 4 shows a block diagram and a timing chart, respectively, of a prior art system called a mapping system.
Figure 4:
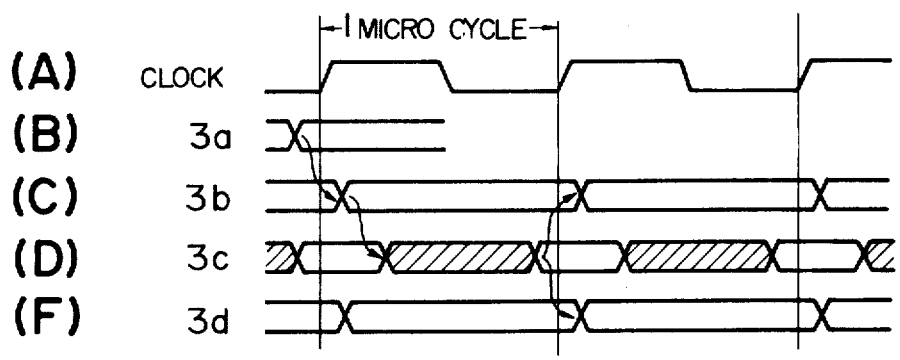

FIG. 3 shows an example of a mapping system and FIG. 4 shows a timing chart therefor. As already indicated, such a system is used in a computer having a simple instruction set. A combination of an output of a fixed bit pattern generating circuit 31 and the content of the instruction register 11 is used as an initial address of the microroutine. It does not use an instruction decoder and hence it is a simple system.

FIG. 4 shows the relation of an output 3a of the instruction register 11, an output 3b of the microprogram address register 14, an output 3c of the microprogram memory 15 and an output 3d of the microinstruction register 16. The advantages and the disadvantages of this system have been discussed hereinabove.

Figure 5:
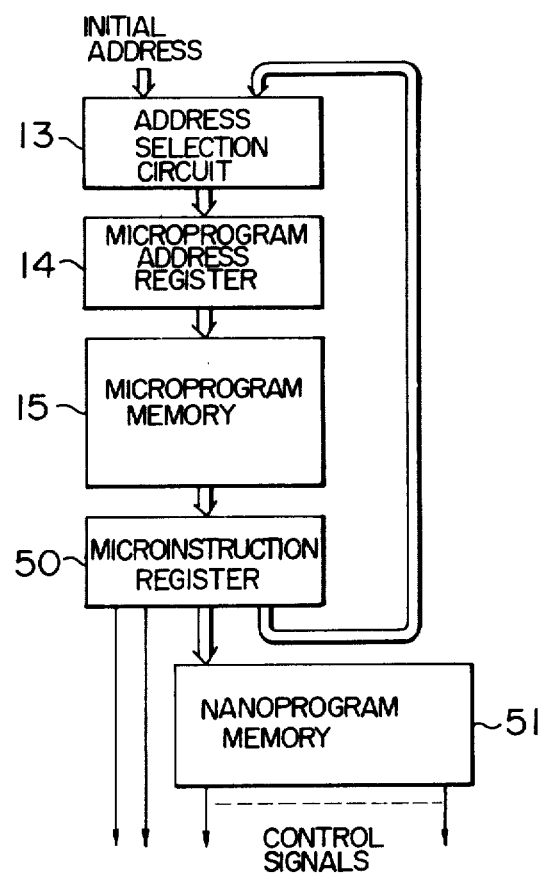
FIG. 5 shows a block diagram of a prior art nanoprogram system.

The microprogram memory 15 contains many microinstructions which are identical to each other in their processing contents except branch-to address information fields and certain control bits of the microinstructions. In the construction shown in FIG. 1B, however, even when the contents of the microinstructions are substantially identical, the microinstructions are separately stored if the branch-to address information fields or certain control bits are different. As a result, the microprogram memory 15 contains a plurality of microinstructions which are identical in major portions of their bit patterns. Consequently, the storage efficiency of the microprogram memory is poor and the required memory capacity is large. An improvement over the above system is known as a nanoprogram system which is shown in FIG. 5. In this system, the microinstruction includes a branch-to address information field, a control bit field and a nanoprogram address field. In response to a nanoprogram address field of a microinstruction read out to the microinstruction register 50, a nanoprogram memory 51 is activated to read out a corresponding nanoinstruction to generate various control signals. With this construction, the number of words of the long word nanoprogram is reduced by eliminating overlaps and the length of words of the microprograms including the number of words is shortened in order to improve the overall efficiency of the memory. However, in this nanoprogram system, the hardware construction is complex and the efficiency is poor unless the word length of the nanoinstruction is very long. As a result, the capacity of the nanoprogram memory 51 increases. In addition, since the readout time of the nanoprogram is additionally required, the processing time from the activation of the microprogram memory to the generation of the control signals increases. Another problem arises in improving the reliability of the microprogram control system.

It is a common method of detecting an error in the microprogram memory to add one parity bit to the microinstruction and check if the total number of "1" bits in the microinstruction is even or odd.

The method of adding the parity bit such that the total number of "1" bits is equal to an even number is called an even parity method, and the method of adding the parity bit such that the total number is equal to an odd number is called an odd parity method.

The error detection system by the addition of the parity bit is effective for the detection of an error in reading out the microinstruction but it cannot detect an error in the microprogram address information or an error in decoding an address of the microprogram memory.

A watch dog timer system is known to be used, as a fault detection system by detecting an overrun of the software or hardware.

A conventional watch dog timer normally counts up clock signals and is reset by a software instruction. When the timer count exceeds a preset count before it is reset, a system restart signal is produced.

The location of insertion of the watch dog timer and the preset count of the timer are selected such that the timer is always reset before the timer count reaches the preset count in a normal operation condition and if the watch dog timer is not reset because of the program overrun or the like, the timer count exceeds the preset count to produce the restart signal and interrupt the abnormal process.

The watch dog timer system is used to prevent an overrun at a software level so that the preset count of the timer usually has a relatively large count. Accordingly, this system is effective for the detection of an abnormal sequence in the software level but it is not practical for the detection of an abnormal sequence in the microinstruction level which needs a rapid response.

Bearing in mind the basic technical description explained above, preferred embodiments of the present invention now will be explained.

Figure 6:
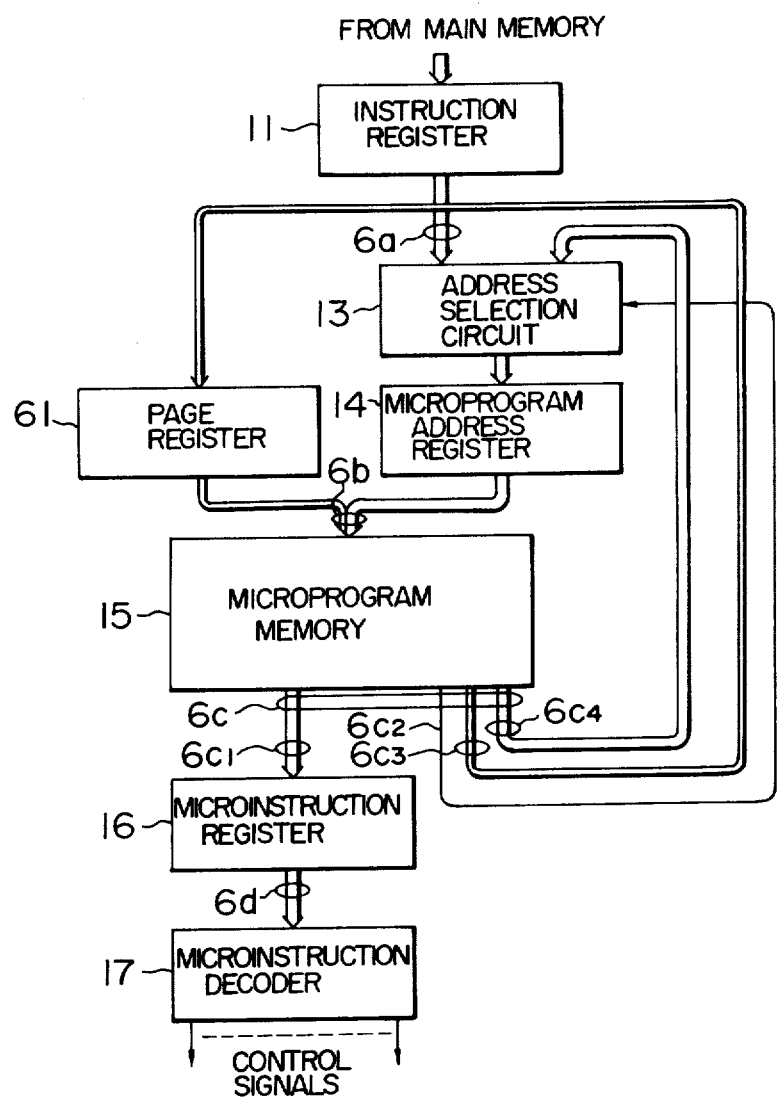
FIG. 6 shows a block diagram of a microprogram control system having a page register, for explaining the present invention.

An embodiment of the present invention is shown in FIG. 6 in which like elements to those in FIGS. 1 and 3 are designated by like reference numerals. A page register 61 relates to the present invention. The content of the instruction register 11 is loaded into the address register 14 through the address selection circuit 13. The content of the page register 61 is controlled by a microprogram. A combination 6b of the content of the page register 61 and the content of the address register 14 is used to designate an address of the microprogram memory 15 to readout a microinstruction word from the microprogram memory 15. The read-out microinstruction includes an operation field 6c1 which is loaded into the microinstruction register 16, an address selection bit 6c2 which controls the address selection circuit 13, a page field 6c3 which is returned to the page register 61 and an address field 6c4 which is returned to the address selection circuit 13. The content of the microinstruction register 16 is decoded by the microinstruction decoder 17 which produces various control signals. The address field 6c4 of the microinstruction returned to the address selection circuit 13 is loaded into the microprogram address register 14, and the page field 6c3 is loaded into the page register 61. The content of the page register 61 and the content of the microprogram address register 14 are combined, and based on the combination 6b, a microinstruction is read out of the microprogram memory 15. In this manner a series of microinstructions are sequentially executed. Address space of the microprogram memory 15 is classified into page areas each including a plurality of words having a common page field. A certain page area of the memory is allocated to leading areas of microroutines which branch depending on the content of the instruction register 11 so that any desired branch can be permitted. In addition, by controlling the content of the page register 61, a plurality of branches can be permitted to a given instruction code (two branches in the example of FIG. 9) so that the system can be adapted to a complex instruction set. The adaptation to a different instruction set is permitted by merely altering the content of the microprogram memory 15 and hence the system has a sufficient general applicability.

Figure 7:
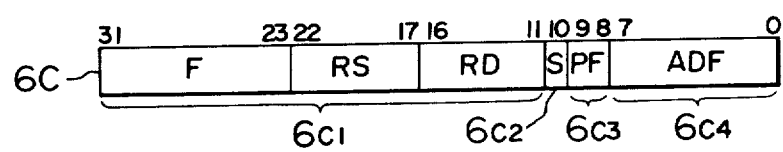
FIG. 7 shows an example of a microinstruction format.

FIG. 7 shows a format of the microinstruction. It comprises a function field F (nine bits) for specifying the type of operation, a source register field RS (six bits) for designating a readout register, a destination register field RD (six bits) for designating a write register, an address selection bit field S (one bit) for controlling the address selection circuit 13, a page field PF (two bits) for designating a next branch-to page and an address field ADF (eight bits) for designating a next branch-to address.

Figure 8:
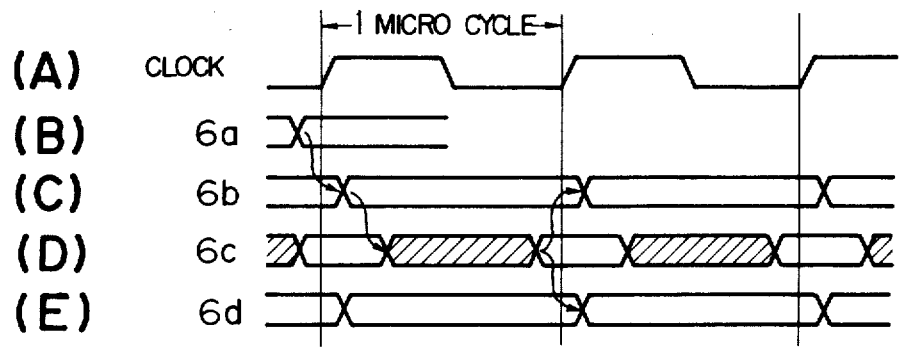
FIG. 8 shows an example of an operation time chart of FIG. 6.

FIG. 8 shows a timing chart for the system of FIG. 6, in which (B) represents the output 6a of the instruction register 11, (C) represents the output 6b of the page register 61 and the address register 14, (D) represents the output 6c of the microprogram memory 15 and (E) represents the output 6d of the microinstruction register 16, and (A) represents the basic clock. The hatched areas represent the access periods as in FIG. 2.

In the system of FIG. 6, no instruction decoder is disposed downstream the instruction register 11. Since the content of the register 11 is directly loaded into the address register 14, the time required to generate the initial address of the microroutine can be shortened as is seen from FIG. 8.

The process procedure in the system of FIG. 6 is now explained. In the instruction set used in the illustrated example, the instruction code is represented by eight bits of which three high order bits define an addressing mode and five low order bits define a content to be executed.

The instructions are classified into the following two major categories depending on their process procedures.

(A) Instructions whose operands to be executed are in the register or instructions which do not need operands, such as an accumulator operation instruction or a return instruction from a subroutine. Those instructions which have "000" in the three high order bit positions are categorized hereto. They are branched to process routines corresponding to the instruction codes after the completion of the instruction fetch routine.

(B) Instructions whose operands are in the memory, such as a load instruction from the memory to the accumulator, an operation instruction between the accumulator and the memory and a jump instruction. These types of instructions have $001 \sim 111$ in the three high order bit positions with the three high order bits defining an operand address calculation mode and the five low order bits defining a content to be executed. The addressing mode includes a direct addressing mode, an indirect addressing mode and a relative addressing mode. These types of instructions branch to the address calculation routines after the completion of the instruction fetch routine and branch to the execution routines corresponding to the instructions after the completion of the address calculation.

In order to execute the instruction, the instruction register 11, the address register 14 and the page register 61 in FIG. 6 have eight bits, eight bits and two bits, respectively, and the following functions are allocated to the pages of the address of the microprogram memory 15.

(1) Pages (00) and (01)

They are used as working areas. Second and subsequent words of the instruction fetch routines and the process routines are stored therein.

(2) Page (10)

It is allotted to a first decoding area of the instruction code. First words of the routines of the type (A) instructions and first words of the address calculation routines of the type (B) instructions are stored therein.

(3) Page (11)

Figure 9A:
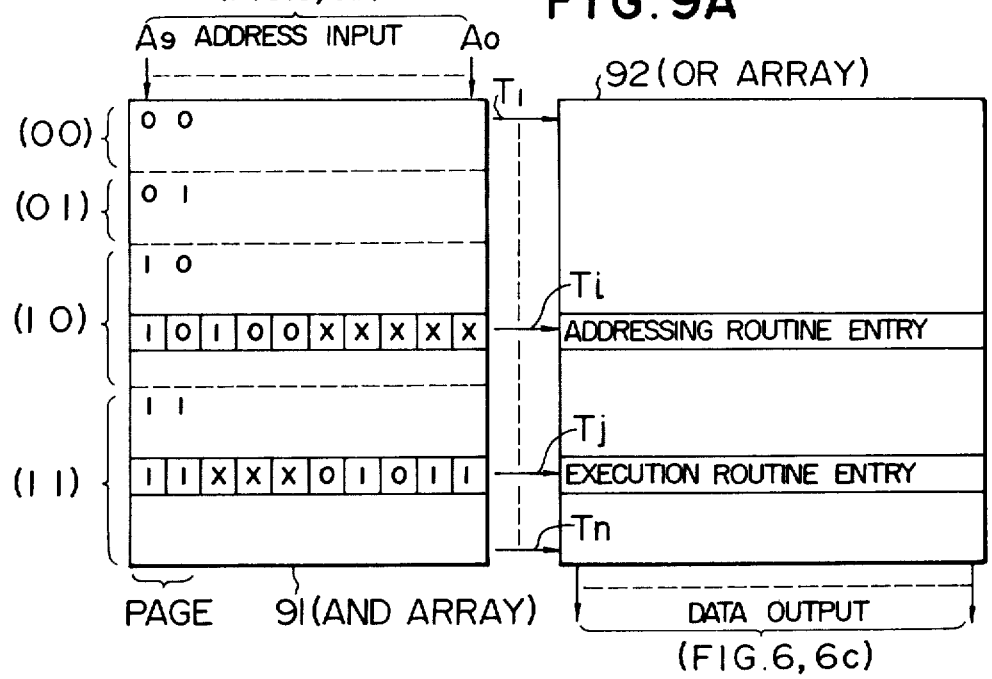
FIG. 9A shows a configuration of a microprogram memory in connection with pages.
Figure 9B:
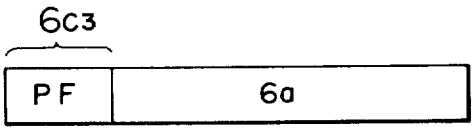
FIG. 9B shows an example of a format of a signal 6b in FIG. 6.
Figure 9B:
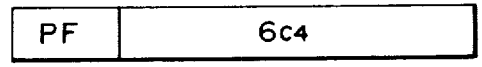
Figure 10A:
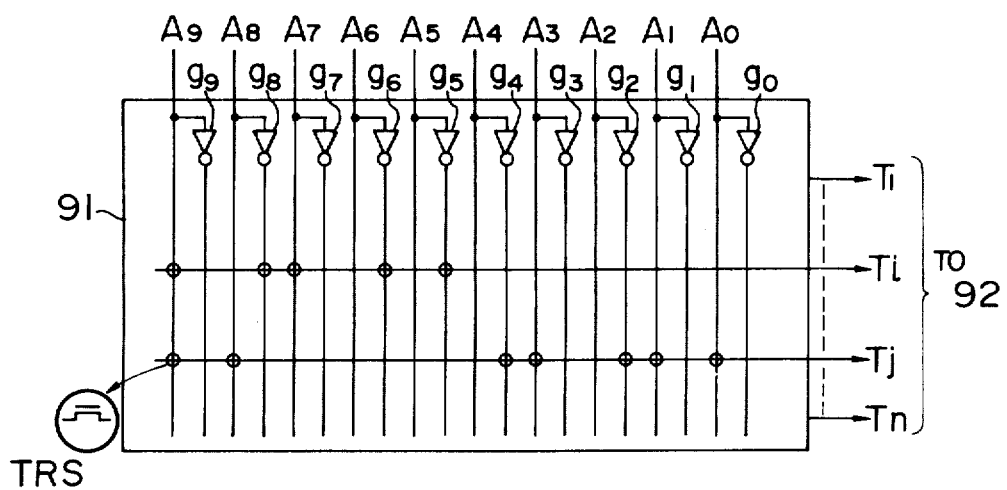
FIG. 10A shows a configuration of an AND array 91 in FIG. 9A.
Figure 10B:
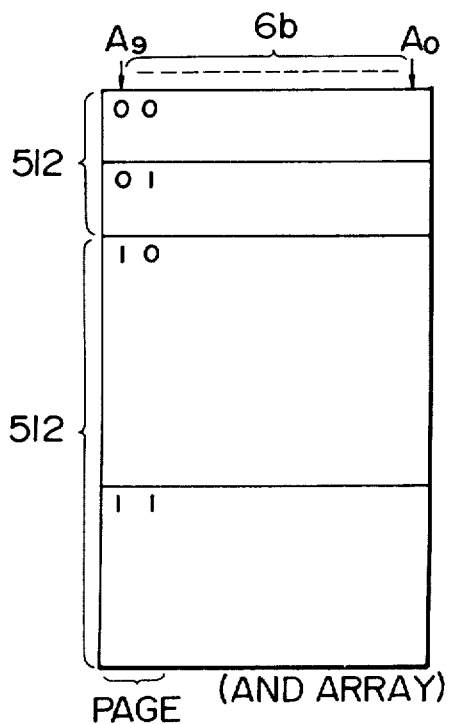
FIG. 10B illustrates the required capacity of the AND array 91 in FIG. 9A in which a decoder is not disposed.
Figure 10C:
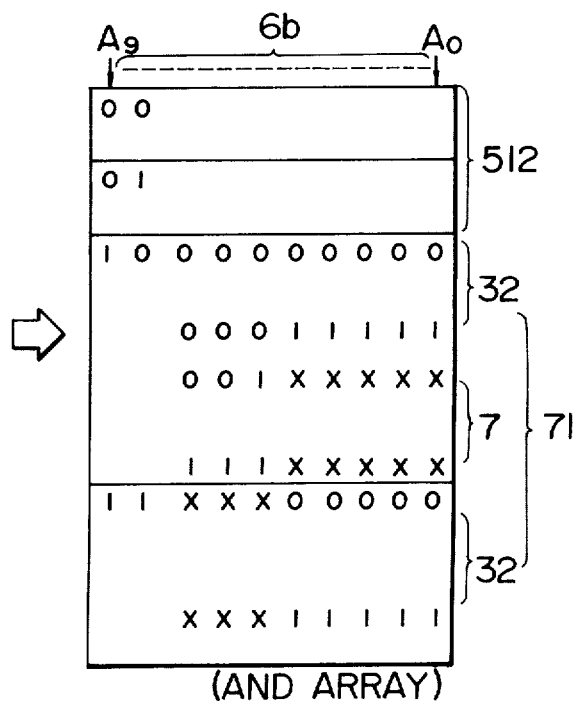
FIG. 10C illustrates an example of the AND array 91 to which the present invention is applied.

It is a second decoding area of the type (B) instruction. First words of the execution routines are stored therein. In the instruction fetch microroutine, an instruction word is read out of the main memory and loaded to the instruction register 11. When the instruction fetch routine is completed, (10) is loaded into the page register 61 and the content of the instruction register 11 is loaded into the address register 14 and the process branches to the address corresponding to the instruction code on the page (10). In the type (A) instruction, the microroutines starting from the address corresponding to the page (10) are execution routines corresponding to the instructions. After the completion of the execution processes, the process returns to the instruction fetch routine. In the type (B) instruction, the address calculation routine starts from the address corresponding to the page (10). When the address calculation routine is completed, (11) is loaded into the page register 61 and the content of the instruction register 11 is loaded into the address register 14 and the process branches to the address corresponding to the page (11). The routines having the first words on the page (11) are the execution routines for the instructions. When the execution routine is completed, the process returns to the instruction fetch routine. Since the address calculation and execution processes for the type (B) instruction are common to a plurality of instruction codes, the microinstructions of a plurality of addresses are identical when the process branches to the page (10) and the page (11). In the present system, one word of the memory is allotted to a plurality of addresses to substantially save the memory capacity. FIG. 9A illustrates the above and it shows an arrangement of the memory. The symbols X indicate non-decoded areas. The memory comprises an AND array 91 which decodes an address input to produce a signal designating a word in the memory and an OR array 92 for producing a content of the word of the memory designated by the output of the AND array 91. The output of the OR array 92 corresponds to the signal 6c in FIG. 6. The input address signals $A_0 \sim A_9$ to the AND array 91 correspond to the signal 6b in FIG. 6. As shown in FIG. 9B, they are read out of the main memory (A) or designated by the previous microinstruction (branch) (B). FIG. 10A shows a detailed circuit configuration of the AND array 91 of FIG. 9. Symbols $g_0 \sim g_9$ indicate gate circuits. In order to decode address information, transistors TRS are connected to positive logic sides of bits "1" of the address input, and to negative logic sides of bits "0" of the address input, respectively. Each of the transistors TRS produces an output "1" in response to an input "1" applied thereto, and a group of transistors TRS disposed for decoding each one of the address inputs are connected to an AND gate thereby to produce an output "1" when all of the transistors of the group receive an input "1". For example, in FIG. 10A, the output Ti goes "1" when the positive logic sides of inputs $A_9$ and $A_7$ are all "1" and the negative logic sides of inputs $A_8$, $A_6$ and $A_5$ are all "1". In an AND array of a conventional memory, the address input is completely decoded to allocate one word of the memory to each address. In the present system, it is effective in some cases to partially decode the address by the AND array 91. More particularly, the X-mark areas in FIG. 9A can be realized in the circuit of FIG. 10A by omitting the transistors TRS either on the positive logic side or on the negative logic side. As a result, the increase of in the capacity of the microprogram memory 15 due to the need of the identical microinstruction at different addresses is avoided. As shown in FIGS. 10B and 10C, 512 transistors required for the pages (10) and (11) are reduced to 71 transistors.

In the type (B) instruction, when the process branches to the addressing routine on the page (10), the five low order bits of the address are not decoded so that only one word of the memory is allotted to a plurality of addresses having different low order bits. The AND array 91 may be constructed to decode the two high order bits or the page designating field of the address on the page (11) and the five low order bits. This system is particularly effective when the microprogram memory is a read-only memory because the content of the address decoder and the content of the memory can be simultaneously designed.

Figure 11A:
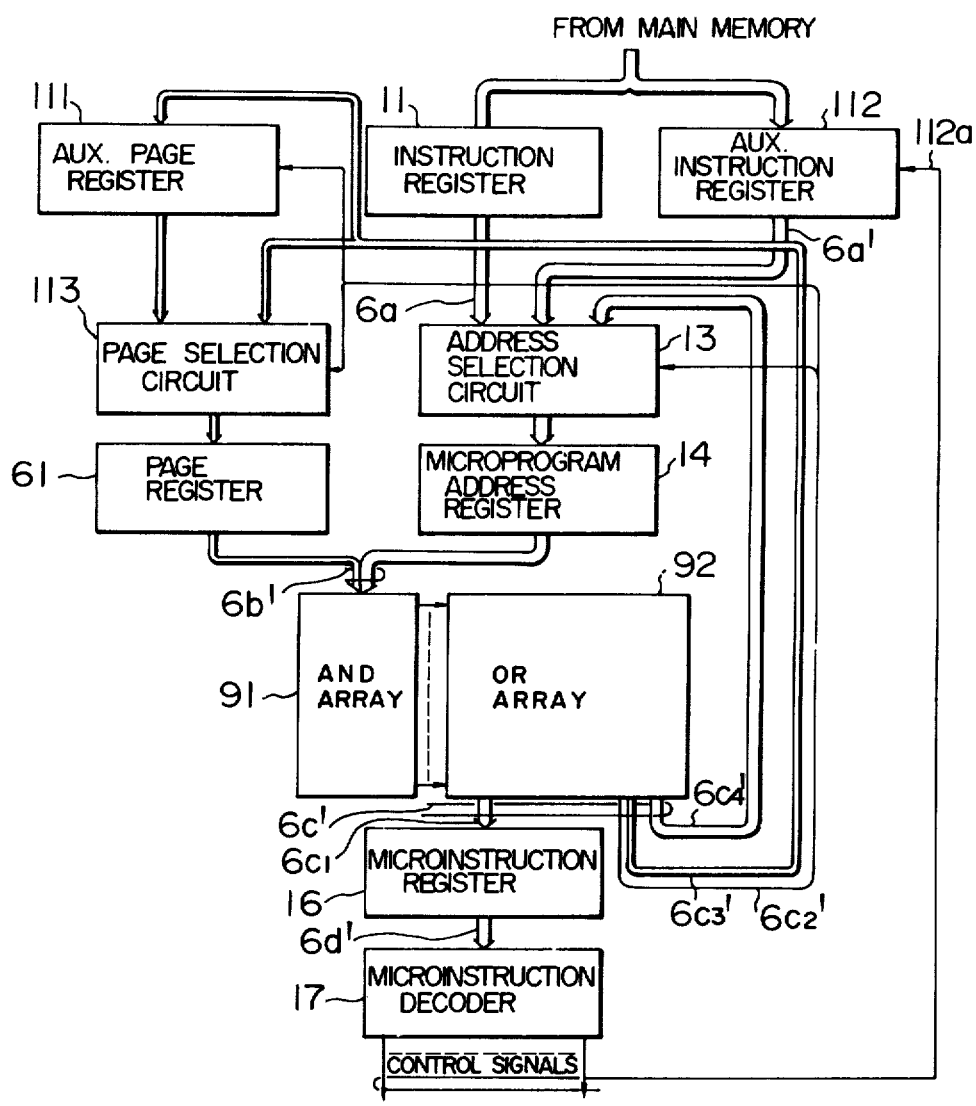
FIG. 11A shows a block diagram of another embodiment of the present invention in which an auxiliary page register and an auxiliary instruction register are provided.

FIG. 11A shows another embodiment of the present invention. It differs from the embodiment of FIG. 6 in that an auxiliary page register 111, an auxiliary instruction register 112 and a page selection circuit 113 are added in order to efficiently process a more complicated instruction set. The elements and their functions are described below.

(1) Auxiliary page register 111

It is a four-bit register and retains data to be located in the page register 61. Any desired content can be preset by the microprogram.

(2) Instruction register 11

It is an eight-bit register and retains an instruction word read out of the main memory.

(3) Auxiliary instruction register 112

Figure 11B:
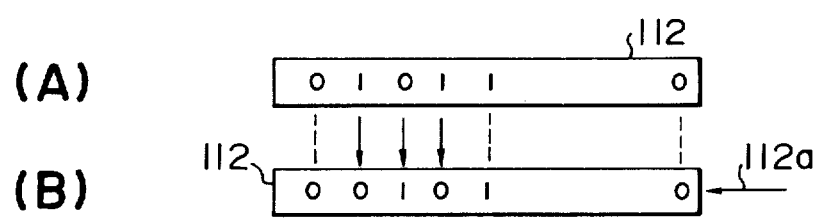
FIG. 11B illustrates set and reset operations by a signal 112a of the auxiliary instruction register.

It is an eight-bit register and has a similar function to that of the instruction register 11. By the provision of two instruction registers, the system is adaptable to a fairly complicated instruction set. The register has an additional function of setting and resetting any bit by a microinstruction 112a (see FIG. 11B). This will be explained hereinafter.

(4) Page selection circuit 113

It selects the data to be loaded into the page register 61 from the content of the auxiliary page register 111 and the page field of the microinstruction read from the memory. It is activated by a selection signal from the microinstruction.

(5) Address selection circuit 13

It selects the data into be loaded to the address register 14 from (i) the output of the instruction register 11, (ii) the output of the auxiliary instruction register 112 and (iii) the address field of the microinstruction. It is activated by a control signal from the microinstruction.

(6) Page register 61

It is a four-bit register and retains four higher order bits of the 12-bit address of the microprogram memory 15.

(7) Microprogram address register 14

It is an eight-bit register and retains eight lower order bits of the memory address.

(8) AND array 91

It is a 12 bits×(number of memory words) array. It decodes an address to designate one word of the memory. The address spaces are sorted by areas (pages) having common four high order bits of the addresses. The address is decoded as partially as possible in order to reduce the number of memory words.

(9) OR array 92

It is a read-only memory having a capacity of (number of memory words)×32 bits for storing microprograms.

(10) Microinstruction register 16

It retains an operation field of a microinstruction read out of the microprogram memory 15.

(11) Microinstruction decoder 17

It decodes the content of the microinstruction register 16 and produces control signals to processing circuits and gate circuits.

Figure 12:
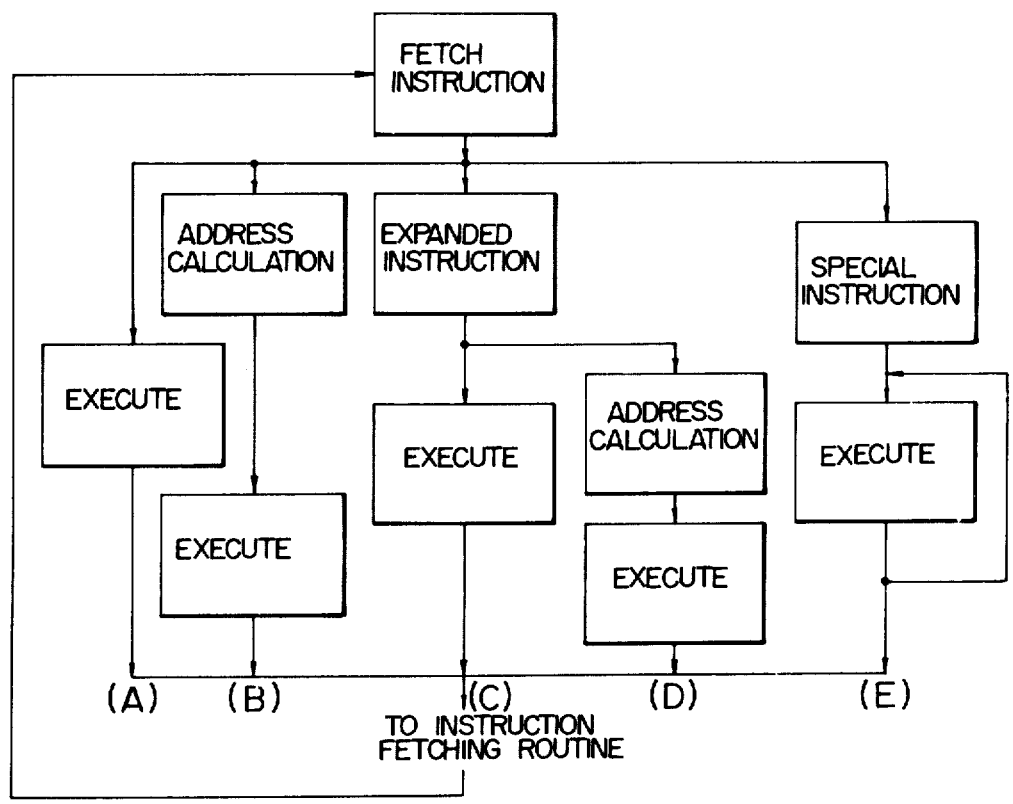
FIG. 12 shows a process flow chart by the instruction formats shown in FIG. 11A.

The instruction set under consideration is now explained. The instructions are classified into the five categories listed in Table 1 depending on their types of process. FIG. 12 shows a process flow for those five types of instructions. In order to execute those instructions, the address spaces of the microprogram memory 15 are allotted as shown in Table 2.

TABLE 1

| | PROCESSES OF INSTRUCTIONS |
|---|---|
| Type of Instruction | Process |
| (A) | Branches directly to an execution routine corresponding to an instruction code. |
| (B) | Branches to corresponding execution routine after operand address calculation. A next sequential word to the instruction code specifies one of a plurality of addressing modes. |
| (C) | If the instruction code of the first word has a particular value, a next sequential second word to the first word defines a new instruction. Branches to an execution routine corresponding to the new instruction. |
| (D) | Similar to (C) but needs operand address calculation. The addressing mode is identical to that of (B) |
| (E) | Bits of a next sequential second word to the instruction code are permission flags to the corresponding process. |

TABLE 2

| | ADDRESS PAGE ALLOCATION |
|---|---|
| Page | Allocation of Functions of Areas |
| 0000 | Work area |
| 0001 | |
| 0010 | First decode area of instruction code |
| 0011 | Decode area for branching to an execution routine after address calculation for type (B) instruction. |
| 0100 | Second decode area of instruction code for type (C) and (D) instructions. |
| 0101 | Decode area for branching to an execution routine after address calculation for type (D) instruction. |
| 0110 | Decode area for execution routine of type (E) instruction. |
| 0111 | Decode area for address calculation. |
| 1000 ⎰ 1111 | Undefined spare areas. Not used in the present instruction set |

Referring to FIGS. 11A and 12, the process flow is now explained.

In the instruction fetch microroutine, an instruction word is read out of the main memory and loaded into the instruction register 11. Upon the completion of the instruction fetch routine, "0010" is loaded into the page register 61 and the content of the instruction register 11 is loaded into the address register 14, and the process branches to an address on the page (0010). In the type (A) instruction, the page (0010) is the leading area of the execution routine and the microinstruction corresponding to the first word of the execution routine is stored in the address corresponding to the instruction word in the page (0010). The second and subsequent words of the routines are stored in the working area. In the type (B) instruction, the address is calculated prior to the execution routine. The address calculation routine is common to the type (B) and (D) instructions but the branch-to addresses after the address calculation are different. In order to efficiently process the above, the auxiliary page register 111 is used. The process of the address calculation differs depending on the content of the next sequential word to the instruction code, but the content of the instruction register 11 should be maintained because it includes information on the branch to the next sequential execution routine. Accordingly, the auxiliary instruction register 112 is used for the address calculation. In the execution of the type (B) instruction on the page (0010), the next sequential word to the instruction code is read out of the main memory and loaded into the auxiliary instruction register 112, and the branch-to page (0011) after the address calculation is loaded into the auxiliary page register 111. Then, the content of the auxiliary instruction register 112 is loaded into the address register 14 and the process branches to the address calculation routine corresponding to the addressing mode on the page (0111). Upon the completion of the address calculation routine, the content of the auxiliary page register 111 is loaded into the page register 61 and the content of the instruction register 11 is loaded into the address register 14. Thus, the process branches to the execution routine on the page (0011) for the type (B) instruction and to the execution routine on the page (0101) for the type (D) instruction. For the type (C) and (D) instructions, the process branches by the instruction code of the second word. Accordingly, if the type (C) or (D) instruction is decoded for the page (0010), the next sequential second word to the instruction code is read out of the main memory and loaded into the instruction register 11. Then, the content of the instruction register 11 is loaded into the address register 14 and the process branches to the page (0100). In the type (C) instruction, the page (0100) is the leading area of the execution routines. In the type (D) instruction, a further next sequential word is read out of the main memory and loaded into the auxiliary instruction register 112. The branch-to page (0101) after the address calculation is loaded into the auxiliary page register 111 and the content of the auxiliary address register 112 is loaded into the address register 14 and the process branches to the address calculation routine on the page (0111). In the type (E) instruction, a conditional jump of microinstruction may be used to the bits of the next sequential second word to the instruction code but it lengthens the microroutine and slows down the processing speed. In order to overcome the above problem, the bit-by-bit set and reset function of the auxiliary instruction register 112 is used (see 112a in FIG. 11B). In the execution of the type (E) instruction on the page (0010), the next sequential second word to the instruction code is read out of the main memory and loaded into the auxiliary instruction register 112. Then the content of the auxiliary instruction register 112 is loaded into the address register 14 and the process branches to the page (0110).

On the page (0110), the bit-by-bit decoding is carried out with priorities put on the respective bits and the process branches to the execution routine corresponding to the bit. When all bits are "0", no process is carried out and the process returns to the instruction fetching routine. In the execution routine corresponding to the bit, the corresponding process is carried out and the corresponding bit of the auxiliary instruction register 112 is reset. Then, the content of the auxiliary instruction register 112 is again loaded into the address register 14 and the process branches to the page (0110). With the microprogram thus constructed, the bits are processed in the order of higher priority until all bits of the auxiliary instruction register 112 change to "0", that is, the processes for "1" bits have been completed. Accordingly, in accordance with the present invention, even a special instruction such as the type (E) instruction can be executed at high speed with less number of memory words.

In accordance with the illustrated embodiments, the content of the instruction register is directly loaded into the address register without routing to an instruction decoder so that the operation speed is increased. By the provision of the page register controlled by the microinstruction, the system is adapted to a complex instruction set. Since the instruction decode function is integrated in the memory, the flexibility and the general applicability of the system are enhanced. A word of the memory can be used to designate a plurality of addresses by decoding the address of the memory partially. By the provision of the auxiliary page register, a common routine can be used at a plurality of points so that the memory capacity can be reduced. Because any bit of the auxiliary instruction register can be set and reset by the microinstruction, a special instruction in which the bits of the next sequential second words to the instruction code are permission flags to the corresponding processes can be processed at a high speed with less number of memory words.

Figure 13:
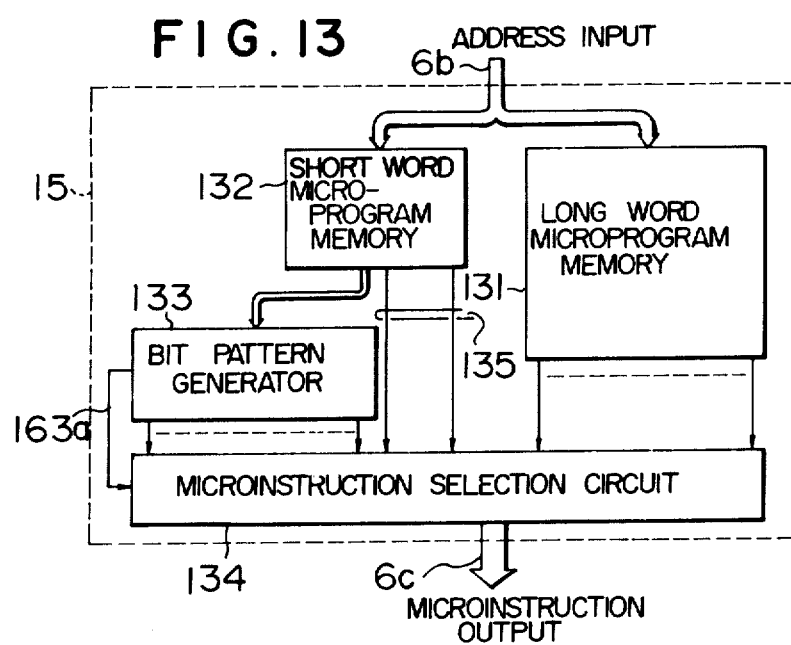
FIG. 13 shows a block diagram in which a short word memory system is introduced to save memory capacity.

FIG. 13 shows an embodiment which enhances the efficiency of the microprogram memory in the microprogram control system. In FIG. 13, the microprogram memory 15 comprises a long word microprogram memory 131, a short word microprogram memory 132, a bit pattern generating circuit 133 and a microinstruction selection circuit 134. The address signal 6b of the microprogram is supplied to the long word and short word microprogram memories 131 and 132 and a microinstruction word corresponding to the address is read out. The output of the long word microprogram memory 131 is directly supplied to the microinstruction selection circuit 134. A portion of the output of the short word microprogram memory 132 is sent to the bit pattern generating circuit 133 and a bit pattern generated therein is sent to the microinstruction selection circuit 134 together with the remaining portion 135. The microinstruction selection circuit 134 selects the long word or the short word. The selection is made by a portion of the read-out microinstruction or a portion of the address information, or a wired OR circuit without special selection signals. In FIG. 13, the selection is made by a signal 163a of either one of two high order bits.

With this arrangement, the short word microinstruction read out of the memory 132 is translated to the long word microinstruction and decoded as one microinstruction.

Figure 14:
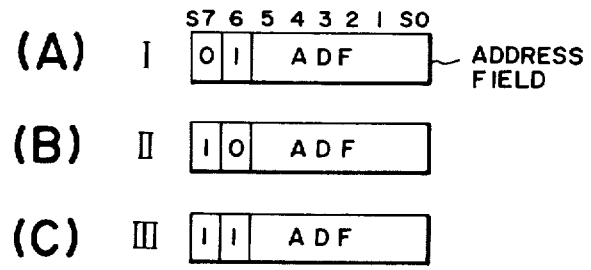
FIG. 14 illustrates short word microinstructions.

FIG. 14 shows three types (I~III) of short word microinstructions having a high frequency of usage. The word length is 8-bit length, S7 and S6 represent a two-bit control field and S5~S0 represent a six-bit branch-to address field (ADF). The control field S7, S6 indicates the microinstruction I when it is (01), the microinstruction II when it is (10), and the microinstruction III when it is (11). The control field does not use (00). In the illustrated embodiment, only when the control field S7, S6 of the read-out short word microinstruction is not (00), the short word microinstruction is selected, and when it is (00) the long word microinstruction is selected. In FIG. 13, the selection signal is designated by 163a.

Figure 15:
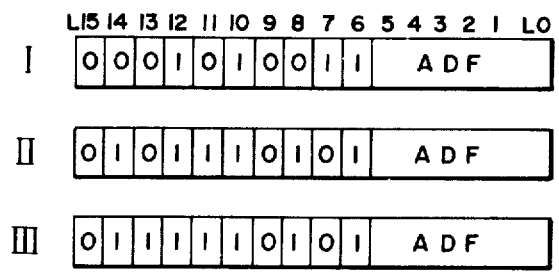
FIG. 15 illustrates long word microinstructions to compare with FIG. 14.

As illustrated in FIG. 15, the long word microinstruction is of 16-bit length with L15~L6 being a 10-bit control field and L5~L0 being a 6-bit branch-to address field. FIG. 15 shows the description of the long word microinstructions of the three types of microinstructions. While many other patterns than those three types exist in the long word microinstructions, those microinstructions are less frequently used than the microinstructions I~III and they are stored in the long word microprogram memory 131.

In FIG. 13, the microinstructions I~III having high frequency of usage are stored in the short word microprogram memory 132 with the description shown in FIG. 14, when the short word microprogram instruction is read out, it is converted to a long word microinstruction pattern shown in FIG. 15 by the bit pattern generating circuit 133.

Figure 16:
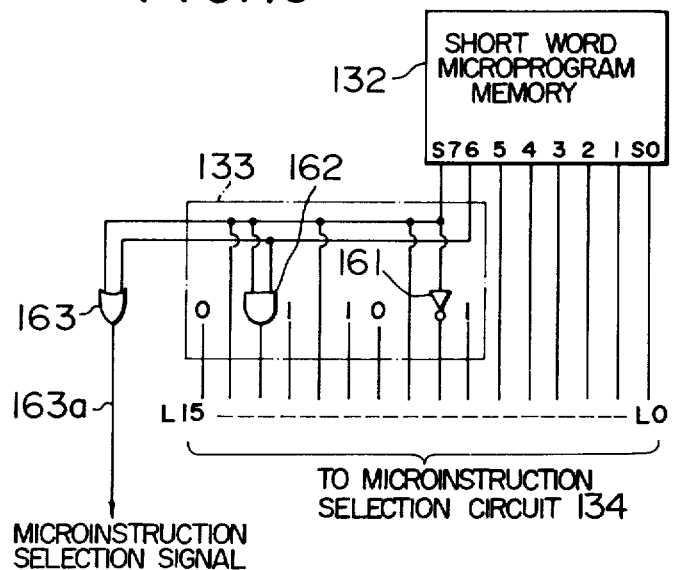
FIG. 16 shows a bit pattern generating circuit in FIG. 13.

FIG. 16 shows an embodiment of the bit pattern generating circuit for converting the short word microinstruction shown in FIG. 14 to the long word microinstruction shown in FIG. 15. The bits S5~S0 of the short word microinstruction directly correspond to the bits L5~L0 of the branch-to address field. "0" signals are supplied to L15 and L9 and "1" signals are supplied to L12, L10 and L6. The bits L14, L11 and L8 and "0" for the microinstruction I and "1" for the microinstruction II and II. Accordingly, the S7 output of the short word microinstruction is directly supplied. The bit L7 is "1" for the microinstruction I and "0" for the microinstructions II and III. Accordingly, the bit S7 is supplied through an inverter 161. Since the bit L13 is "1" only for the microinstruction III, the S6 and S7 outputs are supplied through an AND gate 162. The 16-bit signal at L15~L0 thus produced is applied to the microinstruction selection circuit 134 as the short word microinstruction output. On the other hand, the bits S6 and S7 are supplied through an OR gate 163 as a microinstruction selection signal. The microinstruction selection circuit 134 selects the short word when the selection signal is "1" and the long word when the selection signal is "0". Because of the short length of the word, the short word microprogram memory 132 has shorter readout time than the long word microprogram memory 131. Accordingly, the addition of a few gate circuits as shown in FIG. 16 does not impede the high speed operation of the microprogram control system. In the present system, since only the specified microinstructions are of short word length and the long word microinstructions are also used as well, the generality of the microinstructions is not lost by shortening the word length.

As described above, according to the illustrated embodiment, the microinstructions having high frequency of usage can be stored in short word length by the addition of a few circuit components so that the efficiency of the memory is enhanced without losing the high speed and the general application.

As described hereinabove, the present invention provides a microprogram control system with a high memory efficiency.

Figure 17:
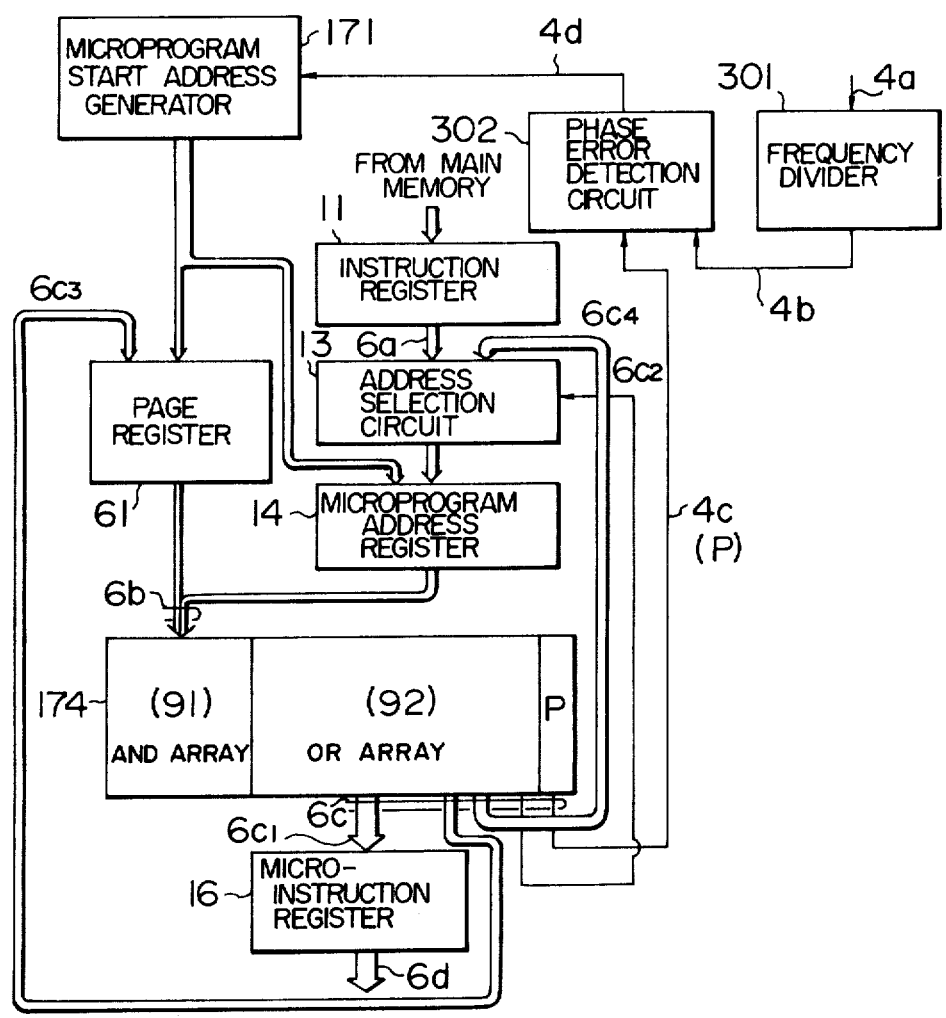
FIG. 17 shows a block diagram of a microprogram control system having a fault detection circuit.

An embodiment which enhances the reliability of the microprogram control system is now explained. In FIG. 17, numeral 171 denotes a microprogram start address generator, numeral 301 denotes a frequency divider and numeral 302 denotes a phase error detection circuit. A phase information bit P added to the microinstruction is used to detect an error.

The frequency divider 301 produces a reference clock 4b having a period which is a multiple of that of the microinstruction execution clock 4a. The reference clock 4b is applied to one input to the phase error detection circuit 302.

A phase information signal 4c to be described later is applied to the other input of the phase error detection circuit 302. Each microinstruction is predetermined to be executed at a predetermined phase of the reference clock 4b and the phase bit P of the microinstruction bears the phase information indicative of such predetermined phase. The phase information of the phase bit P is designated by 4c.

The phase error detection circuit 302 checks the coincidence of the phase information 4c of the phase bit P of the microinstruction with the phase of the reference clock 4b, and in case of anticoincidence it produces an error signal 4d.

The error signal 4d is supplied to the microprogram start address generator 171 which produces a leading address of a sequence error processing microroutine.

Figure 18:
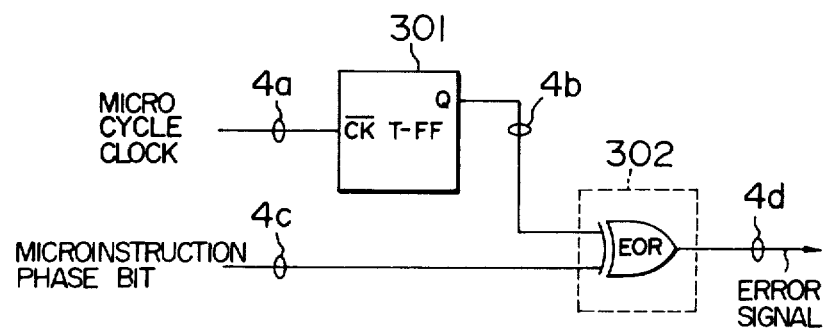
FIG. 18 shows a specific embodiment of the fault detection circuit.
Figure 19:
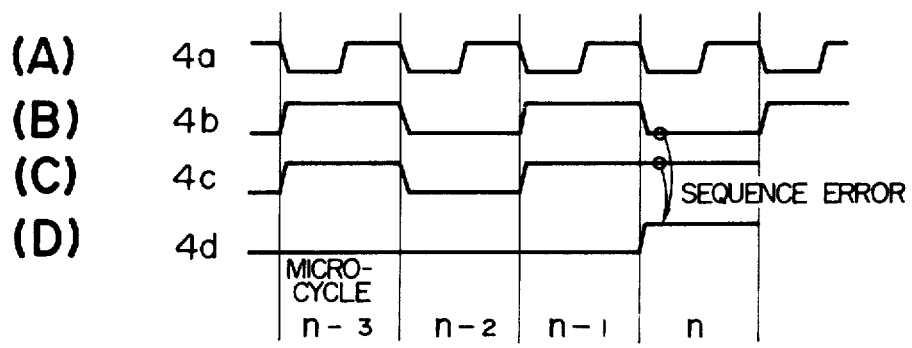
FIG. 19 shows a timing chart therefor.

FIG. 18 shows specific arrangements of the frequency divider 301 and the phase error detection circuit 302 shown in FIG. 17. The frequency divider 301 comprises a T-type flip-flop which divides the microinstruction execution clock 4a by the factor of two to produce the reference clock 4b. As described above, the phase bit P is added to the microinstruction to indicate whether it is executed at the reference clock "1" or "0". The phase error detection circuit 302 comprises an exclusive OR gate which receives the reference clock 4b and the phase information 4c of the microinstruction and produces the error signal 4d. FIG. 19 shows a timing chart for the signals in FIG. 18. It shows the waveforms of the microinstruction execution clock 4a, the reference clock 4b, the microinstruction phases information 4c and the error signal 4d. In the micro-cycles (n−3)~(n−1), the error signal 4d is "0" because the reference clock 4b is in phase with the microinstruction phase information 4c, but in the microcycle n the error signal 4d is "1" because the reference signal 4b is "0" while the microinstruction phase information 4c is "1", indicating an error in the microprogram control sequence.

According to the embodiment of the present invention thus constructed, an error in the microprogram control sequence which is caused by an error in the address information or an error in decoding the address of the microprogram memory 174 can be detected. In the embodiment in which the reference clock has a period which is one half as long as the period of the microinstruction execution clock, approximately one half of errors in the microprogram control sequence can be detected as phase errors. Furthermore since the error detected in the microprogram control sequence can be processed by the microprogram, an abnormal process such as a restart process or interruption process can be readily carried out.

Figure 20:
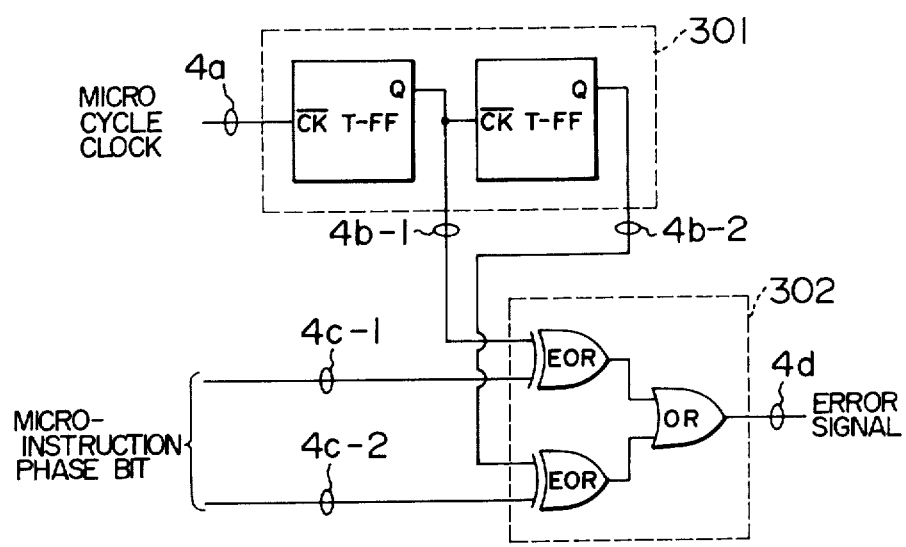
FIG. 20 shows a modification of FIG. 18

FIG. 20 shows the arrangements of the frequency divider 301 and the phase error detection circuit 302 in another embodiment of FIG. 17. The frequency divider 301 comprises two-stage T-type flip-flops which receives the microinstruction execution clock 4a and produces a one-to-two frequency-divided clock 4b-1 and a one-to-four frequency-divided clock 4b-2. Two phase bits are added to the microinstruction and phases "00", "01", "10" and "11" are stored in the sequence of the execution of the microinstructions. The phase bits 4c-1 and 4c-2 of the microinstruction read out correspond to 4b-1 and 4b-2 of the reference clock, respectively, and they are in phase in a normal operation sequence. The phase error detection circuit 302 detects the anticoincidence of the phase bit and the reference clock and it comprises two exclusive OR gates and an OR gate. When 4b-1 and 4c-1 are not inphase or when 4b-2 and 4c-2 are not inphase, the error signal 4d assumes "1".

Figure 21:
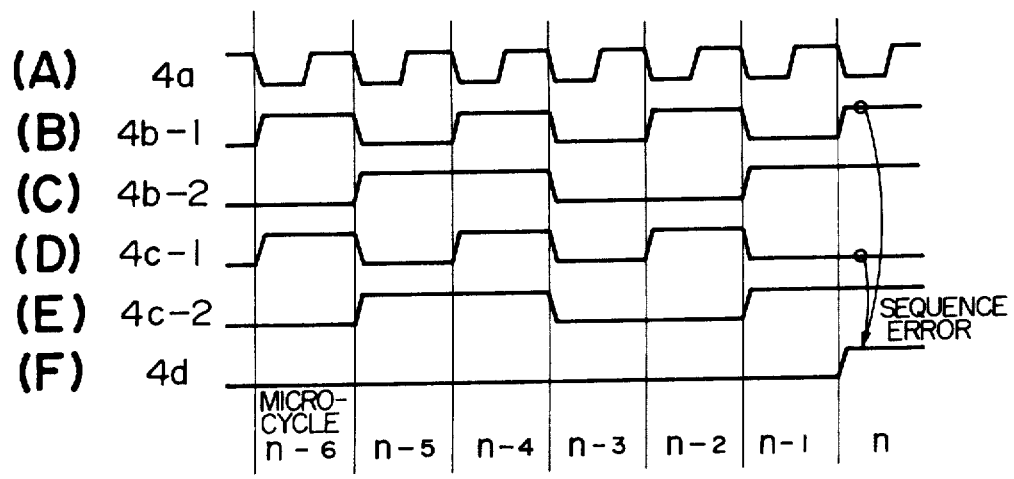
FIG. 21 shows a timing chart therefor.

FIG. 21 shows a timing chart for the signals shown in FIG. 20. It shows waveforms of the microinstruction execution clock 4a, the reference clocks 4b-1 and 4b-2, the microinstruction phase bits 4c-1 and 4c-2 and the error signal 4d. In the micro-cycles (n−6)∼(n−1), the error signal 4d is "0" because the reference clocks 4b-1 and 4b-2 and the microinstruction phase bits 4c-1 and 4c-2 are in phase respectively, but in the micro-cycle n the error signal 4d is "1" because the reference clocks 4b-1 and 4b-2 are "1" and "1", respectively, while the microinstruction phase bits 4c-1 and 4c-2 are "0" and "1", respectively. It shows that an errors was included in the microprogram control sequence in the micro-cycle n.

In the present embodiment in which two phase bits are added to the microinstruction and the clock having a period which is four times of the period of the microinstruction execution clock is used as the reference clock, approximately 75% of the errors in the microprogram control sequence can be detected as phase errors.

What is claimed is:

1. A microprogram control method for use in a system in which a microinstruction of a microprogram is read out of a corresponding address of a microprogram memory in accordance with an instruction read out of a main memory or an externally-supplied instruction, and wherein said microinstruction is decoded to generate an operation control signal to control a processing unit, said method comprising the steps of;

dividing said microprogram memory into pages each consisting of a plurality of words;

designating a selected page of said microprogram memory on the basis of a signal from a page register;

controlling the content of said page register by a microprogram stored in said microprogram memory;

designating an address in the designated and selected page of said microprogram memory on the basis of a signal from an inner page address designating register into which the content of an instruction register containing said instruction can be read directly;

determining the designated and selected page as a decode area of a signal from the instruction register which stores said instruction read out of a main memory or an externally-supplied instruction; and decoding the instruction in said microprogram memory.

2. A microprogram control system in which a microinstruction is read out of a corresponding address of a microprogram memory in accordance with an instruction read out of a main memory or an externally-supplied instruction and in which said microinstruction is decoded to generate an operation control signal to control a processing unit, said system comprising;

a microprogram memory divided into pages;

first register means for designating a page of said microprogram memory under control of a microprogram stored in said microprogram memory;

instruction register means for storing an instruction read out of a main memory or an externally-supplied instruction;

second register means capable of directly reading the content of said instruction register means for designating an address in a page designated by said first register means;

means for combining the content of said first register means and the content of said second register means to produce an address designating a microinstruction stored in said microprogram memory; and means responsive to said address for reading out of said microprogram memory said designated microinstruction as a decoded microprogram instruction.

3. A microprogram control system according to claim 2 wherein said first register means comprises a multi-bit register.

4. A microprogram control system according to claim 2 wherein said microprogram memory comprises means including an AND array for decoding an input address signal and means including an OR array for storing the microinstructions and for reading out said microinstructions in response to the output of said AND array.

5. A microprogram control system according to claim 4 wherein said AND array includes switching means only at bit positions which need decoding.

6. A microprogram control system according to claim 2 wherein said first register means is connected to receive a portion of the microinstruction read out of said microprogram memory to update the page designation contained therein.

7. A microprogram control system according to claim 2 further comprising third register means for supplementing said first register means, and means for loading a portion of the microinstruction read out of said microprogram memory into said third register means and for loading the content of said third register means into said first register means.

8. A microprogram control system according to claim 2 wherein said instruction register means includes a plurality of instruction registers, and including means for loading the content of one of said plurality of instruction registers into said second register means.

9. A microprogram control system in which a microprogram formed by a series of microinstructions is read out of a microprogram memory in response to an instruction which designates the address of the first microinstruction of the series in said microprogram memory, and in which each microinstruction read from said microprogram memory is decoded to generate an operation control signal to control a processing unit, said system comprising:

a microprogram memory having a plurality of addressable storage locations divided into pages for storing a plurality of microinstructions, each including a page designation field, and address field, and an operation field;

instruction register means for storing an instruction designating a microprogram to be executed;

page register means connected to said microprogram memory for storing a page designation derived from the page designation field of a microinstruction read out of said microprogram memory;

address register means for storing an address within a page of said microprogram memory;

selection means connected to said instruction register means and said microprogram memory for storing in said address register means either the content of said instruction register means or the address field of a microinstruction read out of said microprogram memory;

means for combining the content of said page register means and the content of said address register means to produce an address designating a microinstruction stored in said microprogram memory, said microprogram memory including first means for decoding said address from said address producing means and second means responsive to said first means for reading out a microinstruction from one of said addressable storage locations; and means responsive to the operation field of a readout microinstruction for generating an operation control signal to control a processing unit.

10. A microprogram control system according to claim 9 wherein said first means of said microprogram memory comprises an AND array connected to receive said address from said address producing means for decoding said address, and said second means of said microprogram memory comprises an OR array of storage locations for storing said microinstructions and for reading out said microinstructions in response to the decoded output of said AND array.

11. A microprogram control system according to claim 10 wherein said AND array includes switching means only at bit positions which need decoding.

12. A microprogram control system according to claim 9 further comprising auxiliary page register means for supplementing the content of said page register means, and means for loading a portion of said microinstruction readout of said microprogram memory into said auxiliary page register means and for loading the content of said auxiliary page register means into said page register.

13. A microprogram control system according to claim 9 wherein said instruction register means includes a plurality of instruction registers, and further including means for loading the content of one of said plurality of instruction registers into said address register means via said selection means.

14. A microprogram control system according to claim 9 wherein said microinstructions include an address selection signal which is applied to said selection means to control said selection means to store in said address register means the address field of the microinstruction.

* * * * *